United States Patent
Wu

(10) Patent No.: US 12,535,124 B1
(45) Date of Patent: Jan. 27, 2026

(54) PLANETARY ROLLER SCREW

(71) Applicant: CHUAN HONG PRECISION TOOL MANUFACTURING CO., LTD., Kaohsiung (TW)

(72) Inventor: San-Kuei Wu, Kaohsiung (TW)

(73) Assignee: CHUAN HONG PRECISION TOOL MANUFACTURING CO., LTD., Kaohsiung (TW)

( * ) Notice: Subject to any disclaimer, the term of this patent is extended or adjusted under 35 U.S.C. 154(b) by 0 days.

(21) Appl. No.: 19/017,851

(22) Filed: Jan. 13, 2025

(30) Foreign Application Priority Data

Oct. 24, 2024 (TW) .................................. 113140778

(51) Int. Cl.
  *F16H 25/22* (2006.01)
  *F16H 25/24* (2006.01)
(52) U.S. Cl.
  CPC ......... *F16H 25/2252* (2013.01); *F16H 25/24* (2013.01)
(58) Field of Classification Search
  CPC .................................................. F16H 25/2252
  See application file for complete search history.

(56) References Cited

U.S. PATENT DOCUMENTS

| | | | |
|---|---|---|---|
| 3,744,332 A * | 7/1973 | Nilsson | F16H 25/2252 74/424.92 |
| 4,884,466 A * | 12/1989 | Duruisseau | F16H 25/2252 74/424.92 |
| 5,809,837 A * | 9/1998 | Shaffer | F16H 25/2252 74/424.92 |
| 2008/0110704 A1* | 5/2008 | Nakazeki | F16D 65/18 188/158 |
| 2020/0166107 A1* | 5/2020 | Wu | F16H 25/2252 |

FOREIGN PATENT DOCUMENTS

| | | |
|---|---|---|
| CN | 107725708 A | 2/2018 |
| CN | 109386581 A | 2/2019 |
| CN | 212225912 U | 12/2020 |

(Continued)

OTHER PUBLICATIONS

USPTO Machine Translation (retrieved from FIT database) of the Description of WO 2004/094870 A1, Sugitani, Nov. 4, 2004. (Year 2025).*

*Primary Examiner* — Daniel D Yabut
(74) *Attorney, Agent, or Firm* — WPAT, PC

(57) ABSTRACT

A planetary roller screw adapted for solving insufficient structural strength of the conventional planetary roller screw while proceeding with precise motion control is disclosed. The planetary roller screw includes a main screw having an external thread, a nut having an internal thread, and a planetary assembly having rollers. Each roller includes an outer periphery having an external thread. The pitches of the external thread of the main screw, the internal thread of the nut, and the external thread of each roller are identical. The helix direction of the external thread of the main screw is opposite to that of the internal thread of the nut. When one of the main screw, the nut, and the planetary assembly acting as a driving member rotates, a linear displacement direction of the planetary assembly relative to the nut is opposite to that of the main screw relative to the planetary assembly.

11 Claims, 12 Drawing Sheets

(56) References Cited

FOREIGN PATENT DOCUMENTS

| | | | | |
|---|---|---|---|---|
| CN | 114321309 A | 4/2022 | | |
| CN | 115638221 A | 1/2023 | | |
| CN | 118375705 A | 7/2024 | | |
| DE | 102010047981 A1 * | 4/2012 | ......... | F16H 25/2003 |
| EP | 1617103 A1 | 1/2006 | | |
| EP | 3230625 B1 | 10/2020 | | |
| JP | S5697659 A | 8/1981 | | |
| JP | 2007057026 A | 3/2007 | | |
| JP | 2010156453 A | 7/2010 | | |
| JP | 2010156454 A * | 7/2010 | ......... | F16H 25/2252 |
| JP | 2023156010 A | 10/2023 | | |
| TW | M575840 U | 3/2019 | | |
| TW | M666404 U | 2/2025 | | |
| WO | WO-2004094870 A1 * | 11/2004 | ......... | F16H 25/2252 |
| WO | WO2010064508 A1 | 6/2010 | | |
| WO | WO-2020107150 A1 * | 6/2020 | ......... | F16H 25/2252 |

\* cited by examiner

PLANETARY ROLLER SCREW

CROSS REFERENCE TO RELATED APPLICATION

The application claims the benefit of Taiwan application serial No. 113140778, filed on Oct. 24, 2024, and the entire contents of which are incorporated herein by reference.

BACKGROUND OF THE INVENTION

1. Field of the Invention

The present invention relates to a linear displacement technique and, more particularly, to a planetary roller screw.

2. Description of the Related Art

With the development of industrial technology, particularly the development of electric vehicles and humanoid robots, planetary screws are applied to linear displacement control and can be used to replace traditional hydraulic mechanisms due to characteristics of high load capacity, high positioning precision, and high speed motion, etc.

Please refer to FIG. 1 showing a conventional planetary roller screw 9. The planetary roller screw 9 includes plural rollers 93 disposed between a main screw 91 and a nut 92. The main screw 91 includes an external thread 911. The nut 92 includes an internal thread 921 and two non-threaded portions 922 respectively on two sides of the internal thread 921. Two shaft collars 94 are respectively received in the two non-threaded portions 922. Each shaft collar 94 includes an inner annular toothed portion 941 and a fixing plate 95. The plural rollers 93 are identical, and each roller 93 includes an external thread 931 and two outer toothed portions 932. Two ends of each roller 93 extends through the two fixing plates 95, respectively. Furthermore, the plural rollers 93 are disposed around the main screw rod 91 at regular angular intervals about an axis coaxial with the main screw 91. The external threads 931 of the plural rollers 93 mesh with the internal thread 921 of the nut 92 and the external thread 911 of the main screw 91. The outer toothed portions 932 of the plural rollers 93 mesh with the inner annular toothed portion 941 of the shaft collar 94. By the above disposition, when the main screw 91 or the nut 92 rotates, the nut 92 and the plural 93 displace synchronously in the axial direction by the same relative displacement with respect to the main screw 91.

Based on the movement mechanism of the above conventional planetary roller screw 9, one of the main screw 91 and the nut 92, which is to be rotated, is defined as a driving member, whereas the other of the main screw 91 and the nut 92, which is to be displaced linearly, is defined as a follower. In a case that the main screw 91, the nut 92, and the plural rollers 93 have a larger pitch, the linear displacement of the follower is greater when the driving member rotates one round, thereby having a higher linear moving speed, and each component has a greater load/pressure withstanding capacity. In another case that the main screw 91, the nut 92, and the plural rollers 93 have a smaller pitch, the linear displacement of the follower is smaller when the driving member rotates one round, thereby having a lower linear moving speed to precisely control the displacement, but the load withstanding capacity of each component becomes smaller.

Therefore, in the applications on electric vehicles and humanoid robots, the conventional planetary roller screw cannot achieve both the precise displacement control and higher load withstanding capacity at the same time.

Thus, it is necessary to improve the conventional planetary roller screw.

SUMMARY OF THE INVENTION

To solve the above problem, it is an objective of the present invention to provide a planetary roller screw which may significantly increase the motion precision without reducing the load pressure.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "engagement", "coupling", "assembly", "disposition", or similar terms is used to include separation of connected members without destroying the members after connection or inseparable connection of the members after connection. A person having ordinary skill in the art would be able to select according to desired demands in the material or assembly of the members to be connected.

A planetary roller screw according to the present invention includes a main screw, a nut, and a planetary assembly. The main screw includes an outer periphery having an external thread extending along an axis of the main screw, with the axis of the main screw defining an axial direction. The nut includes a through-hole extending along the axial direction. The nut includes an inner periphery surrounding the through-hole. The inner periphery has an internal thread extending along the axial direction. All or a portion of the external thread of the main screw is located in the through-hole of the nut. The planetary assembly includes plural rollers each extending along another axis parallel to the axis of the main screw. Each roller includes an outer periphery having an external thread. At least a portion of each roller is located in the through-hole of the nut. The external thread of each roller meshes with the external thread of the main screw and the internal thread of the nut. A pitch of the external thread of the main screw, a pitch of the internal thread of the nut, and a pitch of the external thread of each roller are identical. A helix direction of the external thread of the main screw is opposite to a helix direction of the internal thread of the nut. One of the main screw, the nut, and the planetary assembly is a driving member. When the driving member rotates, a linear displacement direction of the planetary assembly relative to the nut is opposite to a linear displacement direction of the main screw relative to the planetary assembly.

Thus, in the planetary roller screw according to the present invention, by the disposition and connection between the main screw, the nut, and the rollers, when the driving member rotates, the relative motion between the main screw, the nut, and the planetary assembly will generate corresponding decelerated displacement to thereby achieve precise control of displacement.

In an example, the internal thread of the nut has plural thread starts, and the external thread of the main screw has plural thread starts. Thus, in a case that the nut or the main screw of the whole planetary roller screw is used as the driving member and the pitch circle diameter of the external thread of each roller is smaller, by provision of the internal thread with plural thread starts and the external thread with plural thread starts and cooperating with corresponding adjustments in the relationships between the respective pitch circle diameters, the numbers of thread starts, and the pitches of the external thread of the main screw, the internal thread of the nut, and the external thread of each roller, expected decelerated displacement may be obtained to achieve precision control of displacement.

In an example, the number of the thread starts of the internal thread of the nut is different from the number of the thread starts of the external thread of the main screw. Thus, in a case that the nut or the main screw of the whole planetary roller screw is used as a driving member, through the different in the numbers of thread starts and through corresponding adjustments in the respective pitch circle diameter circles, the numbers of thread starts, and the pitches of the external thread of the main screw, the internal thread of the nut, and the external thread of each roller, expected decelerated displacement may be obtained. Particularly, it is easier to design smaller decelerated displacement to achieve precise control of displacement.

In an example, the helix direction of the internal thread of the nut is opposite to the helix direction of the external thread of each roller. Thus, the helix direction may be selected to be left-handed or right-handed according to the needs in application, thereby deciding the corresponding motion characteristics.

In an example, the planetary assembly further includes an annular frame portion disposed between the main screw and the nut. The annular frame portion includes plural receiving portions. A number of the plural receiving portions is not smaller than a number of the plural rollers, and each roller is received in a corresponding one of the plural receiving portions. Thus, by the disposition of the annular frame portion, the rollers of the planetary assembly may be stably and uniformly disposed around the main screw, which assures that force is uniformly distributed to the rollers, thereby increasing the smoothness while the planetary assembly is running.

In an example, the annular frame portion is an annular member. The plural receiving portions form plural throughholes each extending in a radial direction of the annular frame portion. When each roller is received in the corresponding one of the plural receiving portions, each roller and the corresponding receiving portion have a gap therebetween in a circumferential direction of the annular frame portion about an axis of the annular frame portion. Thus, by providing the spacing between each roller and the corresponding receiving portion, the rotational smoothness between each roller and the main screw and the rotational smoothness between each roller and the nut may be increased.

In an example, each of two ends of each roller in the axial direction includes a protruding portion. The planetary assembly further includes an annular frame portion disposed between the main screw and the nut. The annular frame portion includes two rings spaced from each other along the axial direction. Each of the two rings includes plural recessed portions spaced from each other in a circumferential direction about an axis of the annular frame portion. The plural recessed portions of one of the two rings are aligned with the plural recessed portions of another of the two rings. Each protruding portion of each roller is partially received in a respective one of the recessed portions. Thus, by the disposition of the annular frame portion, the rollers of the planetary assembly may be stably and uniformly disposed around the main screw, which assures that force is uniformly distributed to the rollers, thereby increasing the smoothness while the planetary assembly is running.

In an example, each protruding portion of each roller is provided with an elastic element. Each elastic element is disposed between and abuts against a respective one of the annular frame portions and a respective roller. Thus, each elastic element biases the respective roller to keep a certain tension in the axial direction to avoid the respective roller from deviating away from the axial direction during motion.

In an example, each of the external thread of the main screw, the internal thread of the nut, and the external thread of each roller includes an arcuate flank. Thus, the contact area between the external thread of each roller and the external thread of the main screw and the contact area between the external thread of each roller and the internal thread of the nut may be reduced to reduce the corresponding friction, thereby reducing generation of noise and increasing the rotational smoothness.

In an example, the external thread of the main screw further includes at least one toothed portion. The external thread of each roller of the planetary assembly includes at least one toothed portion. When screwed rotating occurs between the external thread of the main screw and the external thread of each roller, rotating in mesh is generated between the at least one toothed portion of the main screw and the at least one toothed portion of the external thread of each roller. This assures that while the planetary assembly is rotating, each roller revolves through pure rolling motion without unexpected friction caused by sliding motion, thereby increasing the smoothness while the whole planetary roller screw is running.

In an example, the internal thread of the nut includes at least one toothed portion. The external thread of each roller of the planetary assembly includes at least one toothed portion. When screwed rotating occurs between the internal thread of the nut and the external thread of each roller, rotating in mesh is generated between the at least one toothed portion of the nut and the at least one toothed portion of the external thread of each roller. This assures that while the planetary assembly is rotating, each roller revolves through pure rolling motion without unexpected friction caused by sliding motion, thereby increasing the smoothness while the whole planetary roller screw is running.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
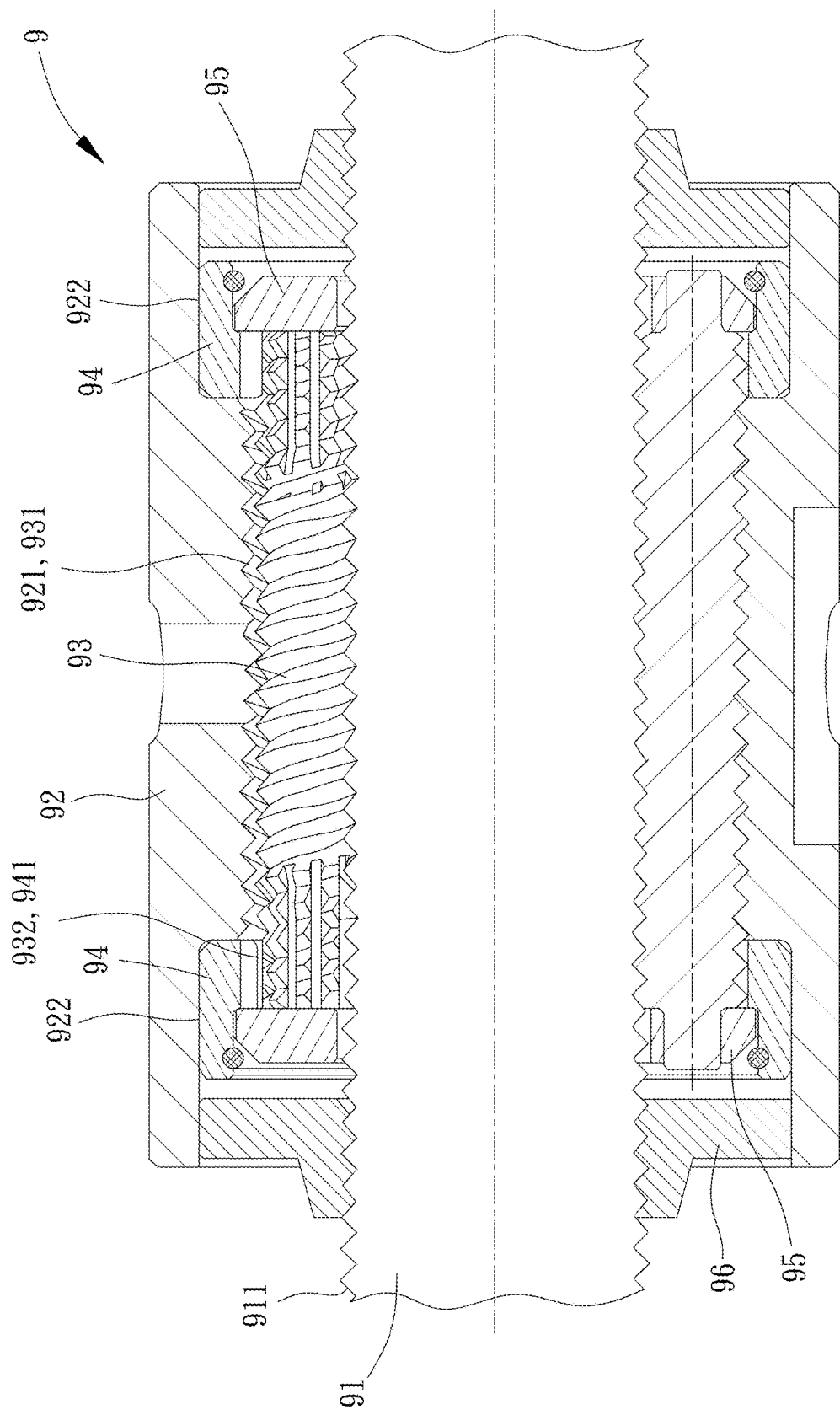
FIG. 1 is a cross sectional view of a conventional planetary roller screw.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

In order to make the above and other objectives, features, and advantages of the present invention clearer and easier to understand, preferred embodiments of the present invention will be described hereinafter in connection with the accompanying drawings. Furthermore, the elements designated by the same reference numeral in various figures will be deemed as identical, and the description thereof will be omitted.

Figure 2:
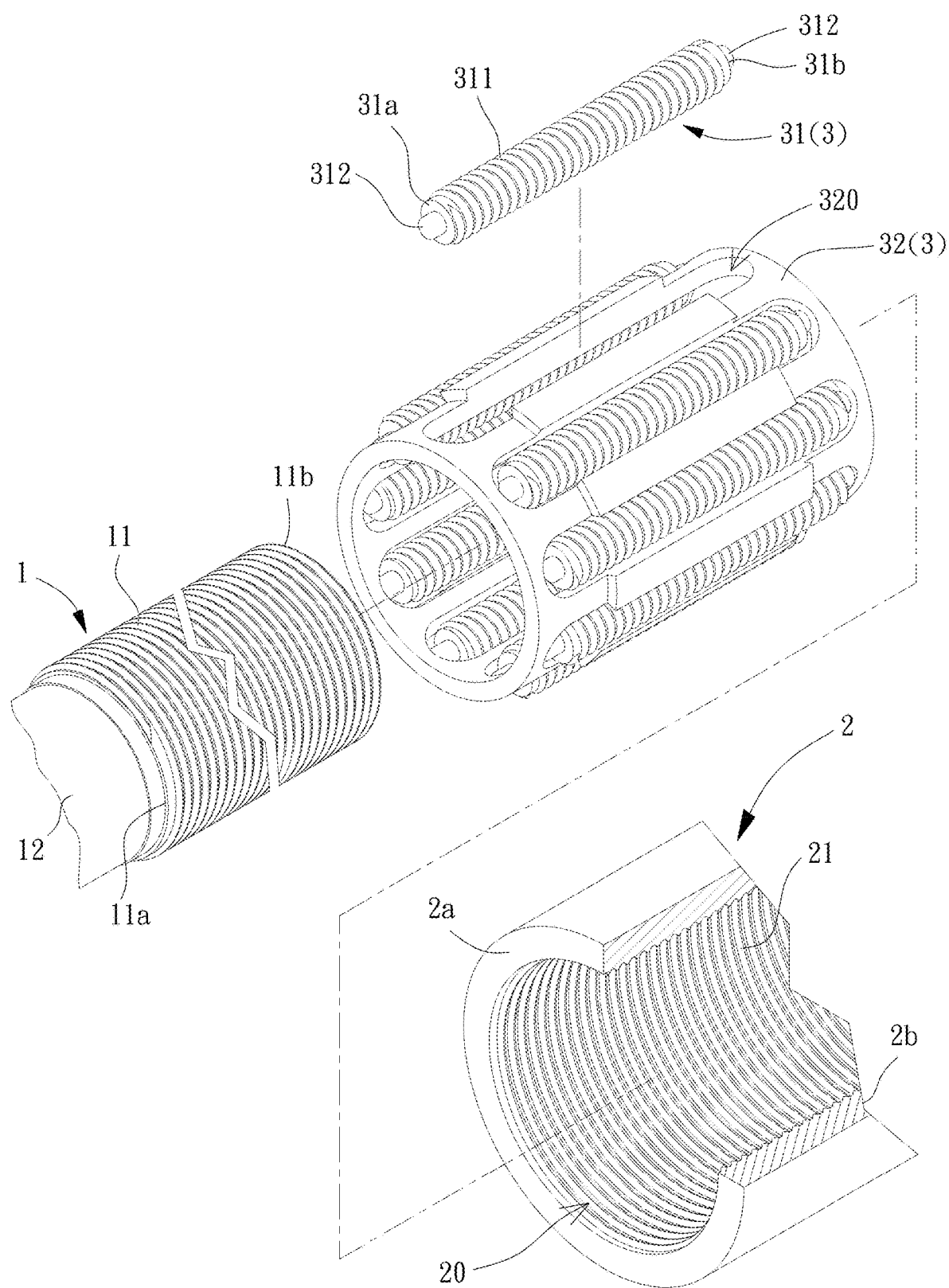
FIG. 2 is an exploded, perspective view of a first embodiment of a planetary roller screw according to the present invention.
Figure 3:
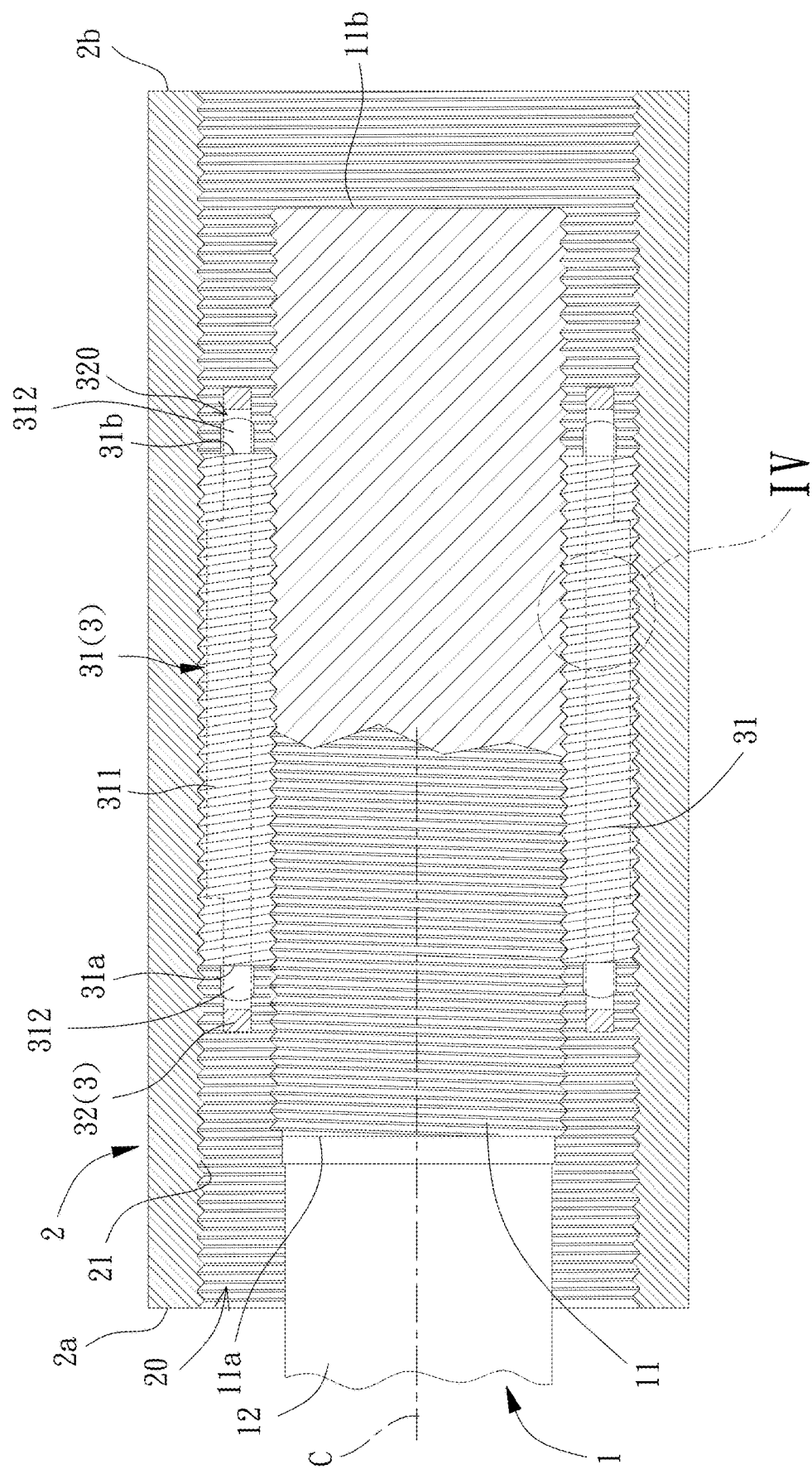
FIG. 3 is a cross sectional view of the planetary roller screw of FIG. 2 after assembly.

With reference to FIGS. 2 and 3, a first embodiment of a planetary roller screw according to the present invention includes a main screw 1, a nut 2, and a planetary assembly 3. The planetary assembly 3 is located in the nut 2 and surrounds the main screw 1. By the above disposition, when the nut 2 rotates about an axis of the main screw 1, the planetary assembly 3 may have linear displacement relative to the nut 2 and the main screw 1 along the axis. Furthermore, the linear displacement direction of the planetary assembly 3 relative to the nut 2 is opposite to the linear displacement direction of the main screw 1 relative to the planetary assembly 3. Alternatively, when the main screw 1 rotates about the axis, the planetary assembly 3 may have linear displacement relative to the main screw 1 and the nut 2 along the axis. Furthermore, the linear displacement direction of the planetary assembly 3 relative to the main screw 1 is opposite to the linear displacement direction of the nut 2 relative to the planetary assembly 3. Namely, the linear displacement direction of the planetary assembly 3 relative to the nut 2 is opposite to the linear displacement direction of the main screw 1 relative to the planetary assembly 3.

The main screw 1 includes an outer periphery having an external thread 11 extending along the axis of the main screw 1, where the axis of the main screw 1 defines an axial direction. The helix direction of the external thread 11 may be either right-handed or left-handed. Optionally, the outer periphery of the main screw 1 may further include a connecting portion 12. Preferably, the external thread 11 may be located adjacent to an end of the main screw 1, and the connecting portion 12 may be located adjacent to another end of the main screw 1. Furthermore, to clearly explain the directional disposition of the present invention, the main screw 1 is defined to include a central axis C, and the extending direction of the central axis C is defined as an axial direction set fourth throughout the specification.

The nut 2 includes a through-hole 20 extending along the axial direction. The nut 2 includes an inner periphery surrounding the through-hole 20, and the inner periphery has an internal thread 21 extending along the axial direction. The helix direction of the internal thread 21 may be either right-handed or left-handed. Particularly, the helix direction of the internal thread 21 is opposite to the helix direction of the external thread 11. At least a portion of the main screw 1 is located in the through-hole 20 of the nut 2. Particularly, all or a portion of the external thread 11 of the main screw 1 is located in the through-hole 20 of the nut 2. Namely, all or a portion of the external thread 11 is aligned with the internal thread 21 in the radial direction.

The planetary assembly 3 includes plural rollers 31 each extending along another axis parallel to the central axis C. Each roller 31 includes an outer periphery having an external thread 311. The helix direction of the external thread 311 of each roller 31 may be either right-handed or left-handed. Particularly, the helix direction of the external thread 311 of each roller 31 is the same as the helix direction of the internal thread 21 of the nut 2. Namely, the helix direction of the external thread 311 of each roller 31 is opposite to the helix direction of the external thread 11 of the main screw 1. At least a portion of each roller 31 is located in the through-hole 20 of the nut 20. Furthermore, the external thread 311 of each roller 31 meshes with the external thread 11 of the main screw 1 and the internal thread 21 of the nut 2. Preferably, the rollers 31 are uniformly distributed around the main screw 1 according to the number of the rollers 31. For example, in a case that the number of the rollers 31 is N, the rollers 31 surround the main screw 1 and are spaced from each other by an angle (360/N degrees). N is an integer greater than one, and, preferably, 360 is divisible by N.

Preferably, the planetary assembly 3 further includes an annular frame portion 32. The annular frame portion 32 is disposed between the main screw 1 and the nut 2 and includes plural receiving portions 320. The number of the plural receiving portions 320 is not smaller than the number of the plural rollers 31, such that each roller 31 may be received in a corresponding one of the plural receiving portions 320. Specifically, the number of the plural receiving portions 320 is M, and the receiving portions 320 are formed on the annular frame portion 32 and are spaced from each other by an angle (360/M degrees). M is an integer not smaller than N, and, preferably, 360 is divisible by M. Thus, by the disposition of the annular frame portion 32 and the receiving portions 320, each roller 31 of the planetary assembly 3 may be stably and uniformly distributed around the main screw 1.

In the embodiment of the invention shown in FIG. 2, the annular frame portion 32 has an annular shape with a central through-hole extending along the axial direction to form a tubular member. The plural receiving portions 320 form corresponding plural through-holes in the radial direction of the annular frame portion 32. Each through-hole has a contour corresponding to a respective roller 31, such that each roller 31 may be received in a corresponding one of the plural receiving portions 320. In an example, when each roller 31 is received in a corresponding one of the plural receiving portions 320, each roller 31 is spaced from the corresponding receiving portion 320 in the circumferential direction, which is advantageous to rotation between each roller 31 and the external thread 11 of the main screw 1 and rotation between each roller 31 and the internal thread 21 of the nut 2. Thus, by the disposition of the plural receiving portions 320 of the annular frame portion 32, aside from permitting easy installation of the plural rollers 31 between the main screw 1 and the nut 2, each roller 31 may be stably disposed between the main screw 1 and the nut 2. Thus, deviation is less likely to occur.

Optionally, each of two ends of each roller 31 in the axial direction may include a protruding portion 312 extending outward along the axial direction of the roller 31, particularly along the central axis of each roller 31. The diameter of each protruding portion 312 is not greater than the diameter of the roller 31 and is preferably smaller than the diameter of the roller 31, such that when each roller 31 is received in the corresponding receiving portion 320 and when each roller 31 comes into contact with the annular frame portion 32 in the axial direction, each roller 31 comes into contact with the annular frame portion 32 (at a peripheral edge of the corresponding receiving portion 320) by the protruding portions 312, thereby reducing the friction while each roller 3 rotates in the corresponding receiving portion 320.

By the above disposition/coupling between the main screw 1, the nut 2, and the planetary assembly 3, when the nut 2 rotates about the central axis C, the planetary assembly 3/each roller 31 may undergo linear displacement relative to the nut 2 and the main screw 1 along the axial direction. Alternatively, when the main screw 1 rotates about the central axis C, the nut 2 and the planetary assembly 3/each roller 31 may undergo linear displacement relative to the main screw 1 and the nut 2 along the axial direction. Likewise, when the planetary assembly 3 rotates about the central axis C, the main screw 1 and the nut 2 may undergo linear displacement relative to the planetary assembly 3 along the axial direction, and the main screw 1 undergoes linear displacement relative to the nut 2. Namely, by the disposition of the planetary roller screw according to the present invention, when any one of the main screw 1, the nut 2, and the planetary assembly 3 is used as a driving member and rotates about the central axis C, the linear displacement direction of the planetary assembly 3 relative to the nut 2 is opposite to the linear displacement direction of the main screw 1 relative to the planetary assembly 3 to generate decelerated displacement, thereby achieving precise motion control.

Figure 4:
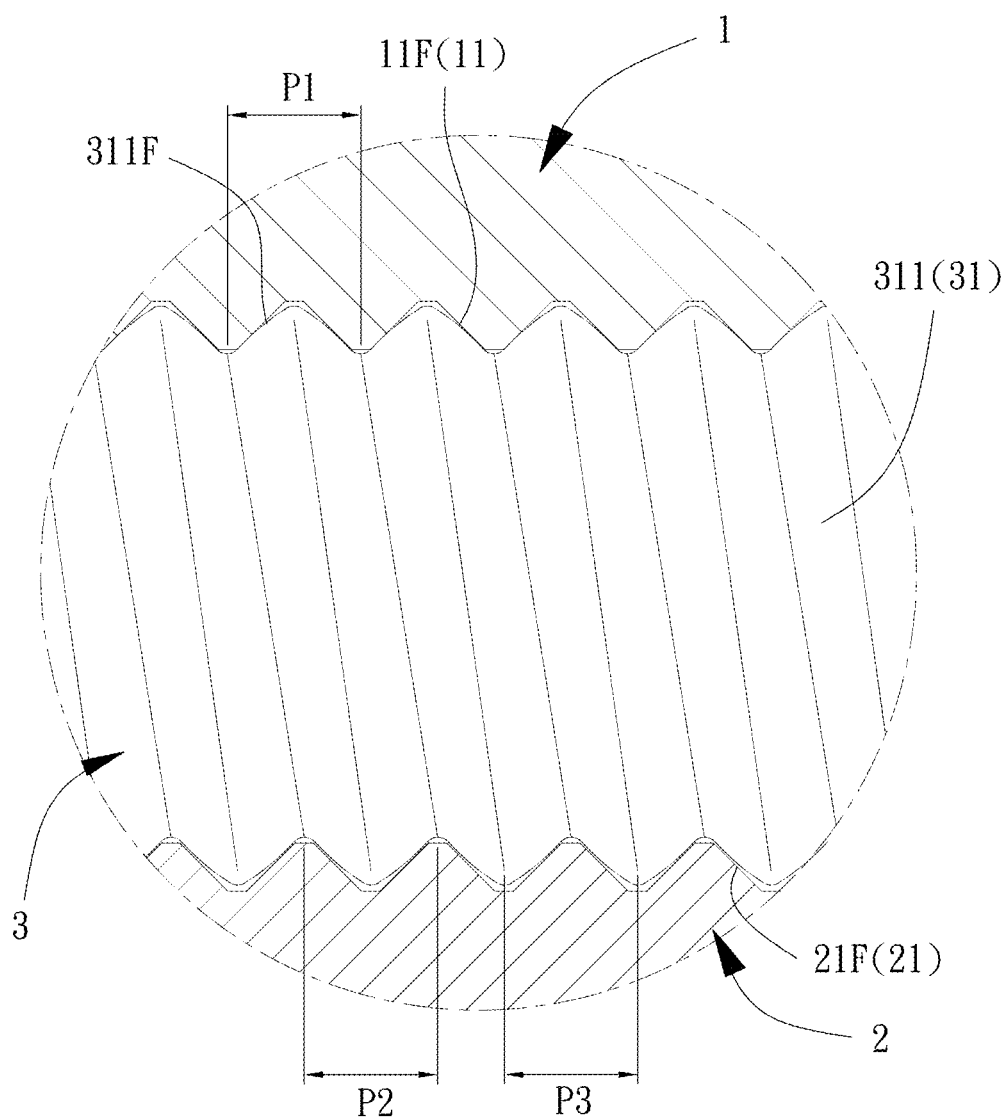
FIG. 4 is an enlarged view of a circled portion IV of FIG. 3.

Specifically, as shown in FIG. 4, to achieve the above mechanism of decelerated displacement, the pitch P1 of the external thread 11 of the main screw 1, the pitch P2 of the internal thread 21 of the nut 2, and the pitch P3 of the external thread 311 of each roller 31 are identical.

Preferably, the flank 311F of the external thread 311 of each roller 31 is arcuate to reduce the contact area between the external thread 311 of each roller 31 and the external thread 11 of the main screw 1 and the contact area between the external thread 311 of each roller 31 and the internal thread 21 of the nut 2. This reduces generation of noise and increases the rotational smoothness. It should be noted that in other examples, any of the flank 11F of the external thread 11 of the main screw 1, the flank 21F of the internal thread 21 of the nut 2, and the flank 311F of external thread 311 of each roller 31 may be optionally arcuate. The present invention is not limited in this regard.

Figure 5:
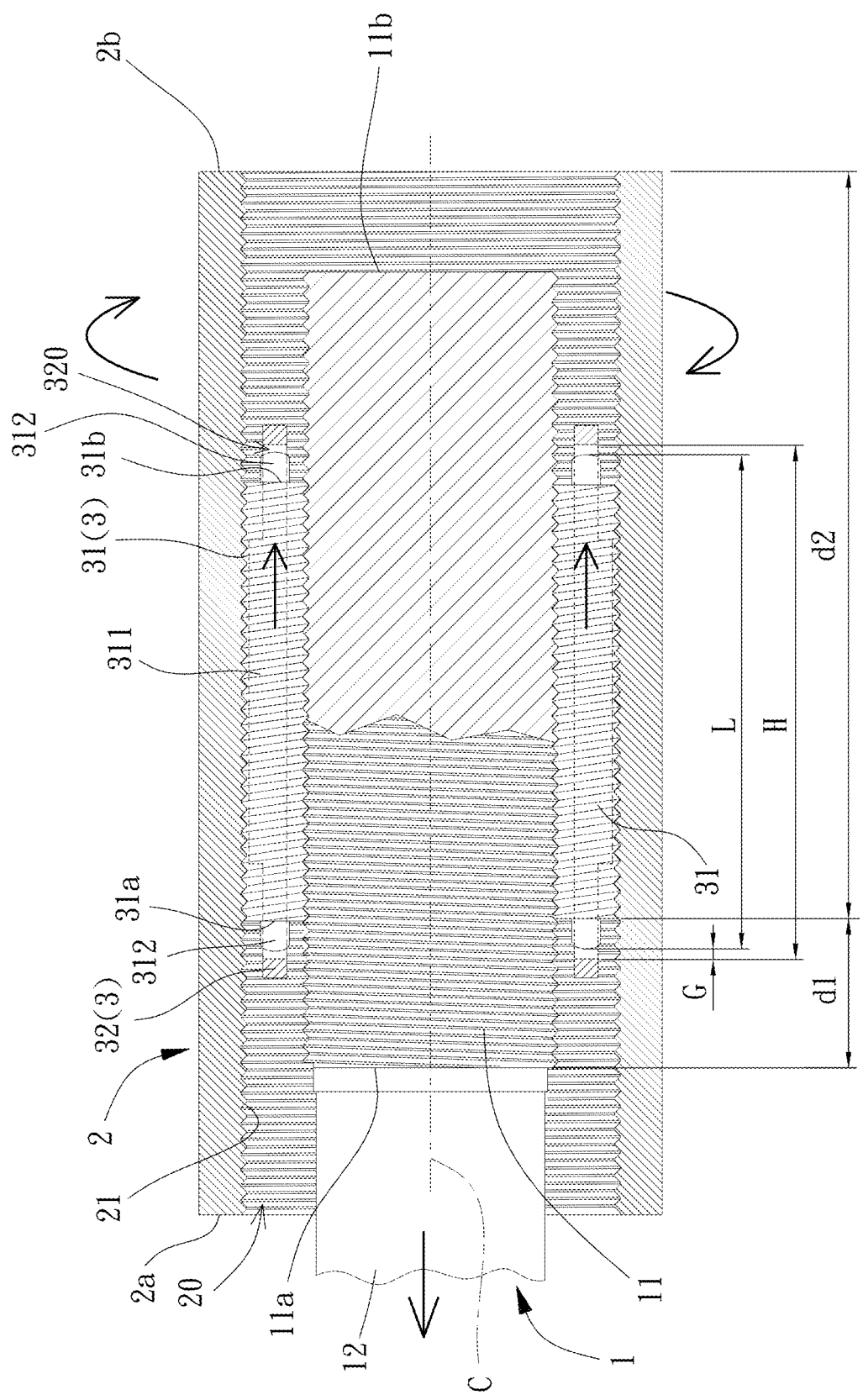
FIG. 5 is a schematic cross sectional view illustrating the motion relationship between the components of the planetary roller screw according to the present invention in which a nut is used as a driving member.
Figure 6:
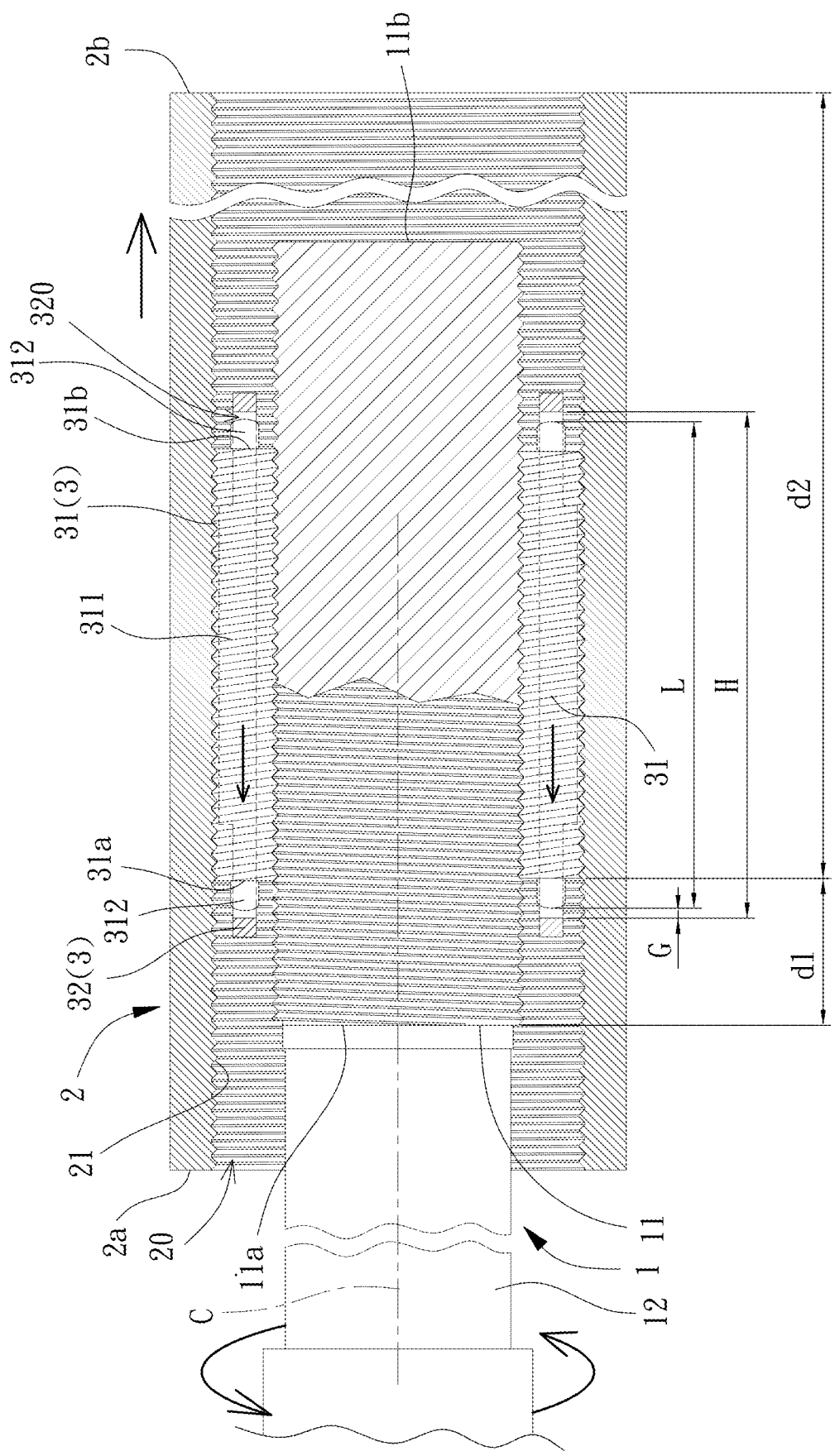
FIG. 6 is a schematic cross sectional view illustrating the motion relationship between the components of the planetary roller screw according to the present invention in which a main screw is used as a driving member.

As shown in FIGS. 2-4, it should be particularly noted that each roller 31 is disposed in a height between the main screw 1 and the nut 2 in the axial direction, which may vary according to the lead angle of the main screw 1 and the nut 2 and the angular position of each roller 31 disposed between the main screw 1 and the nut 2 in the circumferential direction (the rollers 31 are different in the relative angle). In a practical example, in response to the change in the height of each roller 31 in the axial direction, each receiving portion 320 of the annular frame portion 32 may include a through-hole height H greater than the length L of each roller 31 in the axial direction, thereby providing the gap G, as shown in FIGS. 5 and 6. Furthermore, the through-hole height H is greater than the length L of each roller 31 by a length not smaller than 0.5 times the pitch P3, preferably by a length not smaller than 1 time the pitch P3. Optionally, in another example (not illustrated), to permit easy installation of each roller 31 between the main screw 1 and the nut 2, the disposition of the height position of each receiving portion 320 of the annular frame portion 32 in the axial direction may be varied according to the practical needs. Alternatively, in a further example (not illustrated), the length of the protruding portions 312 on two ends of each roller 31 in the axial direction may be varied without changing the disposition of the height position of each receiving portion 320 of the annular frame portion 32 in the axial direction. Thus, when each roller 31 is disposed in the corresponding receiving portion 320, each roller 31 may have a corresponding height in the axial direction suitable for disposition on the main screw 1 and/or the nut 2.

Specifically, as shown in FIG. 5, to more clearly explain the operation mechanism of the planetary roller screw according to the present invention, particularly the relationship of the rotating direction and the linear displacement direction of each component, it is further defined that the external thread 11 of the main screw 1 includes a top end 11a and a bottom end 11b opposite to the top end 11a in the axial direction, the nut 2 includes a top end 2a and a bottom end 2b opposite to the top end 2a in the axial direction, and each roller 3 includes a top end 31a and a bottom end 31b opposite to the top end 31a in the axial direction. The top end 11a of the external thread 11, the top end 2a of the nut 2, and the top end 31a of each roller 31 define a first direction, whereas the bottom end 11b of the external thread 11, the bottom end 2b of the nut 2, and the bottom end 31b of each roller 31 define a second direction.

In the example shown in FIG. 5, both the helix direction of the internal thread 21 of the nut 2 and the helix direction of the external thread 311 of each roller 31 are right-handed. The helix direction of the external thread 11 of the main screw 1 is left-handed. When viewed from the bottom end 2b of the nut 2 toward the top end 2a of the nut 2, in an example that the nut 2 is used as the driving member and rotates in a clockwise direction (the same as the helix direction of the nut 2) about the central axis C of the main screw 1, the internal thread 21 will actuate each roller 31 to revolve about the central axis C of the main screw 1 in the same direction (clockwise). At this time, the whole planetary assembly 3 (along with the plural rollers 31 thereon) undergoes linear movement relative to the nut 2 along the axial direction. Furthermore, the plural rollers 31 undergoes linear displacement toward the second direction (toward the bottom end 2b of the nut 2).

Then, due to the opposite helix directions of the external thread 311 of each roller 31 and the external thread 11 of the main screw 1, all the plural rollers 31 undergo linear displacement relative to the main screw 1 along the axial direction. Furthermore, the main screw 1 undergoes relative linear displacement toward the first direction (the top end 11a of the external thread 1). It should be particularly noted that, by the above disposition, the main screw 1 can only undergo linear motion along the axial direction without rotational motion in the circumferential direction. Furthermore, the linear displacement direction of the planetary assembly 3 relative to the nut 2 is opposite to the linear displacement direction of the main screw 1 relative to the planetary assembly 3.

Based on the disposition and motion relationship shown in FIG. 5, it is defined that the top end 11a of the external thread 11 and the top end 31a of each roller 31 have a first spacing d1 therebetween, and the top end 31a of each roller 31 and the bottom end 2b of the nut 2 have a second spacing d2 therebetween. When the main screw 1 moves toward the first direction to increase the first spacing d1, each roller 31 moves toward the second direction to reduce the second spacing d2. Since the main screw 1 is disposed on the planetary assembly 3 formed by the rollers 31, decelerated displacement will occur between the main screw 1 and the nut 2 along the axial direction. The decelerated displacement may be defined by the spacing between the top end 11a of the external thread 11 and the bottom end 2a of the nut 2 before and after motion. Namely, the decelerated displacement may be the sum of the variation of the first spacing d1 and the variation of the second spacing d2.

Likewise, based on the disposition and motion relationship shown in FIG. 5, when the nut 2 rotates in the counterclockwise direction, the main screw 1 undergoes linear displacement toward the second direction to reduce the first spacing d1, and the plural rollers 31 undergo linear displacement toward the first direction to increase the second spacing d2. This may also generate the decelerated displacement between the main screw 1 and the nut 2 along the axial direction.

In another example, as shown in FIG. 6 which is a continuation of the disposition shown in FIG. 5, the main screw 1 is used as the driving member and rotates about the central axis C of the main screw 1 in the counterclockwise direction. The external thread 11 of the main screw 1 will actuate each roller 31 to revolve about the central axis C of the main screw 1 in the same direction (counterclockwise). At this time, all the plural rollers 31 undergo linear displacement relative to the main screw 1 along the axial direction, and the plural rollers 31 undergo linear displacement toward the second direction (namely, toward the bottom end 2b of the nut 2).

Next, since the helix direction of the external thread 311 of each roller 31 and the helix direction of the internal thread 21 of the nut 2 are the same, the whole planetary assembly 3 (along with the plural rollers 31 thereon) undergoes linear displacement relative to the nut 2 along the axial direction. Furthermore, the nut 2 undergoes relative linear displacement toward the first direction (namely, toward the top end 11a of the external thread 11). It should be particularly noted that, by the above disposition, the nut 2 can only undergo linear motion along the axial direction without rotational motion in the circumferential direction. Furthermore, the linear displacement direction of the planetary assembly 3 relative to the main screw 1 is opposite to the linear displacement direction of the nut 2 relative to the planetary assembly 3.

Based on the disposition and motion relationship shown in FIG. 6, the nut 2 may be deemed as being disposed on the planetary assembly 3 formed by the plural rollers 31. When the plural rollers 31 moves toward the second direction to increase first spacing d1, the nut 2 moves toward the first direction at the same time to reduce the second spacing d2. Finally, since the nut 2 is disposed on the planetary assembly 3 formed by the rollers 31, the above-mentioned decelerated displacement along the axial direction will occur between the main screw 1 and the nut 2.

Based on the disposition and motion relationship shown in FIG. 6, when the main screw 1 rotates in the clockwise direction, the plural rollers 31 will undergo linear displacement toward the first direction to reduce the first spacing d1, and the nut 2 will undergo linear displacement toward the second direction to increase the second spacing d2. This may also generate the decelerated displacement between the main screw 1 and the nut 2 along the axial direction.

It should be particularly noted that, based on the mechanism of the planetary roller screw according to the present invention, the helix direction of the internal thread 21 of the nut 2 is the same as the helix direction of the external thread 311 of each roller 31 and is opposite to the helix direction of the internal thread 21 of the nut 2. Thus, although the helix direction of the internal thread 21 of the nut 2 and the external thread 311 of each roller 31 of the planetary roller screw according to the present invention is right-handed, and the helix direction of the external thread 11 of the main screw 1 is left-handed, the component disposition from the outer side to the inner side may be deemed as nut 2-rollers 31-main screw 1, and the helix direction may be represented as right-right-left. Nevertheless, the present invention may also include the disposition in which the helix direction of the internal thread 21 of the nut 2 and the external thread 311 of each roller 31 is left-handed, and the helix direction of the external thread 11 of the main screw 1 is right-handed. The corresponding helix direction may be represented as left-left-right. Furthermore, the directions of rotation and linear displacement of each component in the left-left-right disposition are opposite to the directions of rotation and linear displacement of the same component in the right-right-left disposition.

It should be particularly noted that, based on the disposition of the planetary roller screw according to the present invention shown in FIGS. 2-4 and the motion mechanism shown in FIGS. 5 and 6, no matter which of the main screw 1 and the nut 2 according to the present invention is used as the driving member and rotates about the central axis C, the decelerated displacement will occur. Thus, under a pitch disposition condition the same as or similar to the conventional technique, the relative displacement between the main screw 1 and the nut 2 may be reduced to achieve more precise motion control. Furthermore, since the pitch disposition condition of the main screw 1, the nut 2, and the rollers 31 remain the original state (not adjusted to a tighter condition) without incurring additional processing costs, the main screw 1, the nut 2, and the rollers 3 may maintain the same load withstanding capacity. Namely, in comparison with the conventional technique shown in FIG. 1, when it is desired to achieve the same precision control of displacement (namely, the follower has the same displacement when the driving member rotates one round), the planetary roller screw according to the present invention may have a larger pitch and, thus, have better load withstanding capacity, thereby saving the manufacturing costs.

It should be further noted that although FIGS. 5 and 6 respectively show the nut 2 and the main screw 1 acting as the driving member, based on the motion mechanism of the planetary roller screw according to the present invention, the planetary assembly 3 may be used as the driving member to make the nut 2 and the main screw 1 undergo linear displacement relative to the planetary assembly 3 along the axial direction. In this case, although the planetary assembly 3 is deemed immobile, the nut 2 undergoes linear displacement relative to the planetary assembly 3, such that the planetary assembly 3 may be deemed as undergoing relative linear displacement with respect to the nut 2, which still fulfills the above motion mechanism. The linear displacement direction of the planetary assembly 3 relative to the nut 2 (in this case, the nut 2 is deemed immobile, and the motion direction of the planetary assembly 3 relative to the immobile component is observed) is opposite to the linear displacement direction of the main screw 1 relative to the planetary assembly 3 (in this case, the planetary assembly 3 is deemed immobile, and the motion direction of the main screw 1 relative to the immobile component is observed).

It should be further noted that the numerical values of the first spacing d1, the second spacing d2, and the decelerated displacement are associated with the relationship between the pitch circle diameters, the numbers of thread starts, and the pitches of the external thread 11 of the main screw 1, the internal thread 21 of the nut 2, and the external thread 311 of each roller 3. Preferably, the pitch circle diameters, the numbers of thread starts, and the pitches may be designed according to the motion principle between the meshed threads, which can be appreciated by those having ordinary skill in the art, to achieve the requirements in the motion relationship and precision between the main screw 1, the nut 2, and the rollers 31. Particularly, the lead is the product of the number of thread starts and the pitch. Namely, the disposition of the motion condition may be deemed as in association with the pitch circle diameter and the lead.

Preferably, the internal thread 21 of the nut 2 has plural thread starts, the external thread 11 of the main screw 1 has plural thread starts, and, optionally, the number of thread starts of the external thread 11 of the main screw 1 may be the same as or different from the number of thread starts of the internal thread 21 of the nut 2. Thus, according to the embodiment of the whole planetary screw roller generally using the nut 2 or the main screw 1 as the driving member and based on a smaller pitch circle diameter of the external thread 311 of each roller 31, by provision of the internal thread 21 with plural thread starts and the external thread 11 with plural thread starts and cooperating with corresponding adjustments in the relationships between the respective pitch circle diameters, the numbers of thread starts, and the pitches of the external thread 11 of the main screw 1, the internal thread 21 of the nut 2, and the external thread 311 of each roller 32, expected decelerated displacement may be obtained to achieve precision motion control.

Particularly, in a practical example, the number of thread starts of the internal thread 21 of the nut 2 may be five (5), the number of thread starts of the external thread 11 of the main screw 1 may be four (4), and the number of thread start of the external thread 311 of each roller 31 may be one (1). Thus, based on the whole planetary screw roller generally using the nut 2 or the main screw 1 as the driving member, based on the external thread 311 of each roller 31 with a smaller pitch circle diameter, and based on the internal thread 21 of the nut 2 with a pitch circle diameter greater than the pitch circle diameter of the external thread 11 of the main screw 1, by providing the internal thread 21 and the external thread 11 which have different number of thread starts (particularly the number of thread starts of the internal thread 21 is greater than the number of thread starts of the external thread 11, and the number of thread start of the external thread 311 of each roller 31 is one) and cooperating with corresponding adjustments in the relationships between the respective pitch circle diameters, the numbers of thread starts, and the pitches of the external thread 11 of the main screw 1, the internal thread 21 of the nut 2, and the external thread 311 of each roller 32, smaller decelerated displacement may be designed more easily to achieve precision motion control.

It should be noted that the numbers of thread starts of the internal thread 21 of the nut 2, the external thread 11 of the main screw 1, and the external thread 311 of each roller 31 are not limited to the above examples. Furthermore, it should be noted that the external thread 311 of each roller 31 may have plural thread starts. Furthermore, it should be noted that the number of thread start of the internal thread 21 and/or the external thread 11 may be one (1).

Particularly, in a specific example, given that the pitch circle diameters, the numbers of thread starts, the pitches, and the helix directions of the external thread 11 of the main screw 1, the internal thread 21 of the nut 2, and the external thread 311 of each roller 31 are specifically arranged, in a case that the pitch circle diameter of the external thread 11 of the main screw 1 is an integral multiple of the pitch circle diameter of the external thread 311 of each roller 31, when the nut 2 is used as the driving member and rotates, relative displacement will not occur between each roller 31 and the main screw 1. Under the above specific arrangement, in another case that the pitch circle diameter of the external thread 11 of the main screw 1 is not an integral multiple of the pitch circle diameter of the external thread 311 of each roller 31, when the nut 2 is used as the driving member and rotates, relative displacement will occur between each roller 31 and the main screw 1.

Figure 7:
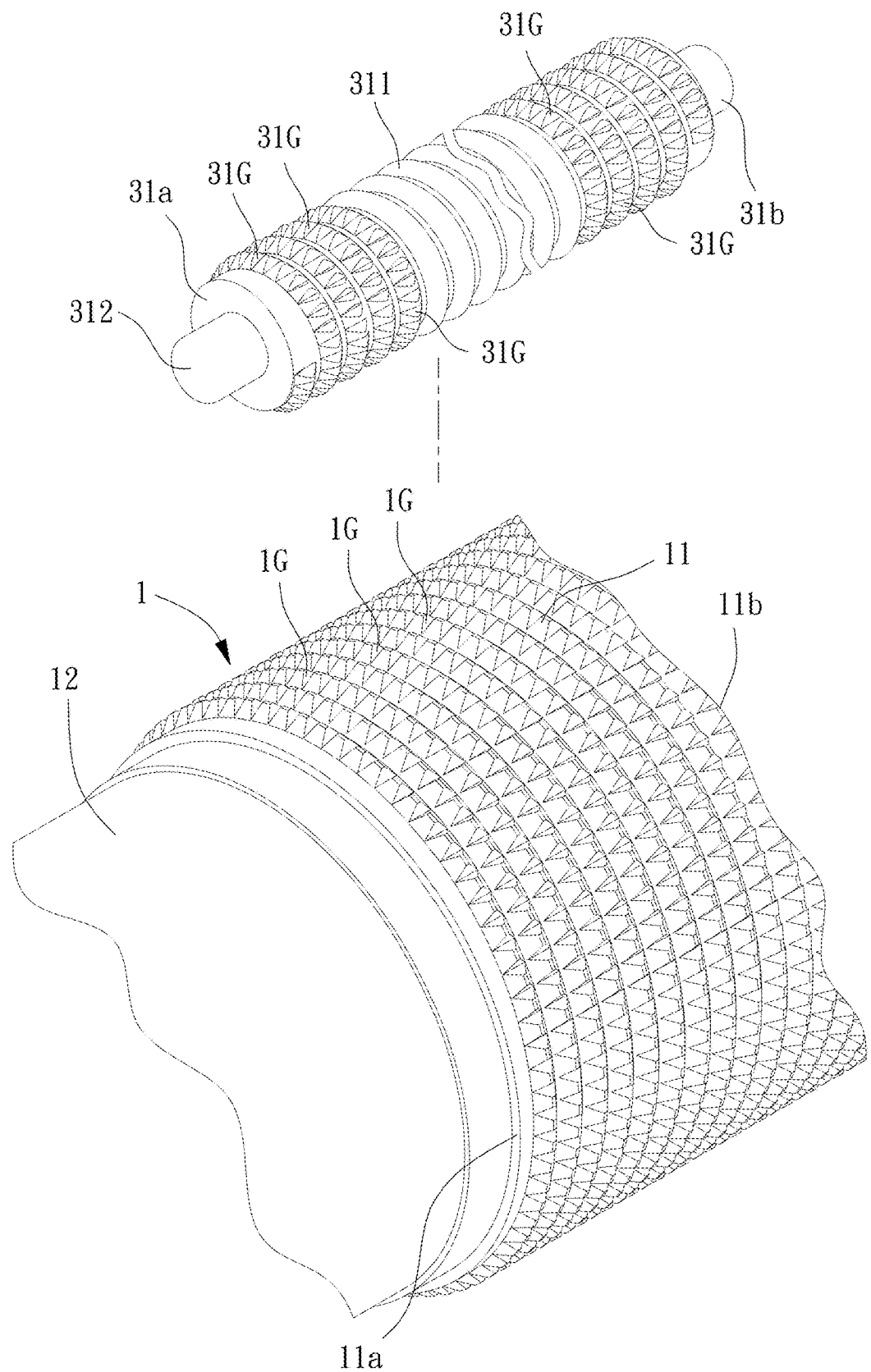
FIG. 7 is a schematic view illustrating a main screw and a roller with meshable toothed portions.
Figure 8:
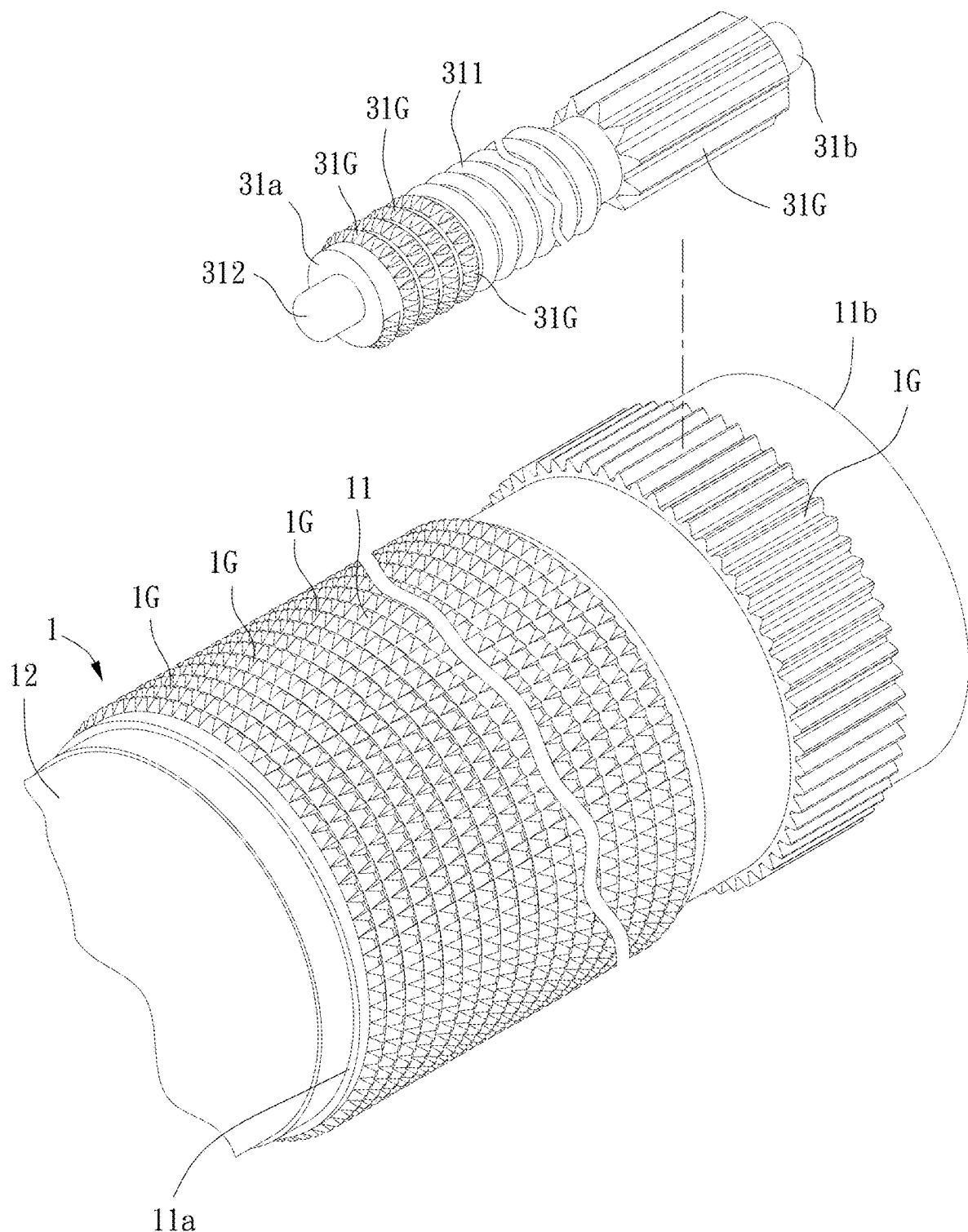
FIG. 8 is a schematic view illustrating a main screw and a roller with meshable toothed portions and meshable spur gears.

Please refer to FIGS. 7 and 8 showing another preferred disposition of the main screw 1 and each roller 31 of the planetary assembly according to the present invention. In comparison with FIGS. 2-4, the main screw 1 further includes at least one toothed portion 1G. Each roller 31 further includes at least one toothed portion 31G, such that when screwed rotating occurs between the external thread 11 of the main screw 1 and the external thread 311 of each roller 31, rotating in mesh is generated between the at least one toothed portion 1G of the main screw 1 and the at least one toothed portion 31G of each roller 31. Furthermore, through the rotating in mesh between the at least one toothed portion 1G and the at least one toothed portion 31G, when the planetary assembly 3 rotates (each roller 31 revolves about the main screw 1), each roller 31 revolves through pure rolling/rotation without unexpected friction caused by sliding motion, thereby increasing the smoothness while the whole planetary roller screw is running.

In the example shown in FIG. 7, the main screw 1 includes a toothed portion 1G disposed throughout the external thread 11 of the main screw 1. Nevertheless, in other examples (not illustrated), the toothed portion 1G may be arranged to be in the form of a single section or plural sections disposed on a single local area or plural local areas of the main screw 1 or the external thread 11 of the main screw 1. Each roller 31 includes two toothed portions 31G respectively disposed on two local areas adjacent to two ends (namely, the top end 31a and the bottom end 31b of the roller 31) along the axial direction of the external thread 311 of each roller 31. Nevertheless, in other examples (not illustrated), the toothed portion 31G may be arranged to be in the form of a single section disposed throughout the external thread 311 of each roller 31, or arranged to be in the form of a single section or plural sections disposed on a single local area or plural local areas of each roller 31 or the external thread 311 of each roller 31. Particularly, the toothed portion 1G is in the form of plural recessed structures or plural protrusive structures formed on the external thread 11 of the main screw 1. The toothed portions 31G are used to mesh with the toothed portion 1G and are in the form of plural protrusive structures or plural recessed structures formed on the external thread 311 of each roller 31.

The example shown in FIG. 8 is different from that the example shown in FIG. 7 by that the main screw 1 further includes another toothed portion 1G disposed on an outer portion of one of the two ends in the axial direction of the external thread 11 of the main screw 1. The another toothed portion 1G has a spur gear structure. One of the two toothed portions 31G of each roller 31 is disposed on an outer portion of one of the two ends of the external thread 311 of each roller 31 in the axial direction. Furthermore, one of the two the toothed portions 31G has a spur gear structure to mesh with one of the two toothed portions 1G with the spur gear structure. It should be noted that the toothed portion 1G with the spur gear structure and the toothed portion 31G with the spur gear structure shown in FIG. 8 are disposed on the outer portion of the bottom end 11b of the main screw 1 and the outer portion of the bottom end 31b of the respective roller 31, respectively. Nevertheless, in other dispositions, the toothed portion 1G with the spur gear structure and the toothed portion 31G with the spur gear structure may be disposed on the outer portion of the top end 11a of the main screw 1 and the outer portion of the top end 31a of the respective roller 31. In another example (not illustrated), the main screw 1 may include two toothed portions 1G (with spur gear structures) respectively disposed on the outer portion of one of the two ends of the external thread 11 of the main screw 1 and the outer portion of another of the two ends of the external thread 11 of the main screw 1, such that the external thread 11 of the main screw 1 is located between the two toothed portions 1G. Each roller 31 may also include two toothed portions 31G (with spur gear structures) respectively disposed on the outer portion of one of the two ends of the external thread 311 of the roller 31 and the outer portion of another of the two ends of the external thread 311 of the roller 31, such that the external thread 311 of the roller 31 is located between the two toothed portions 31G.

Figure 9:
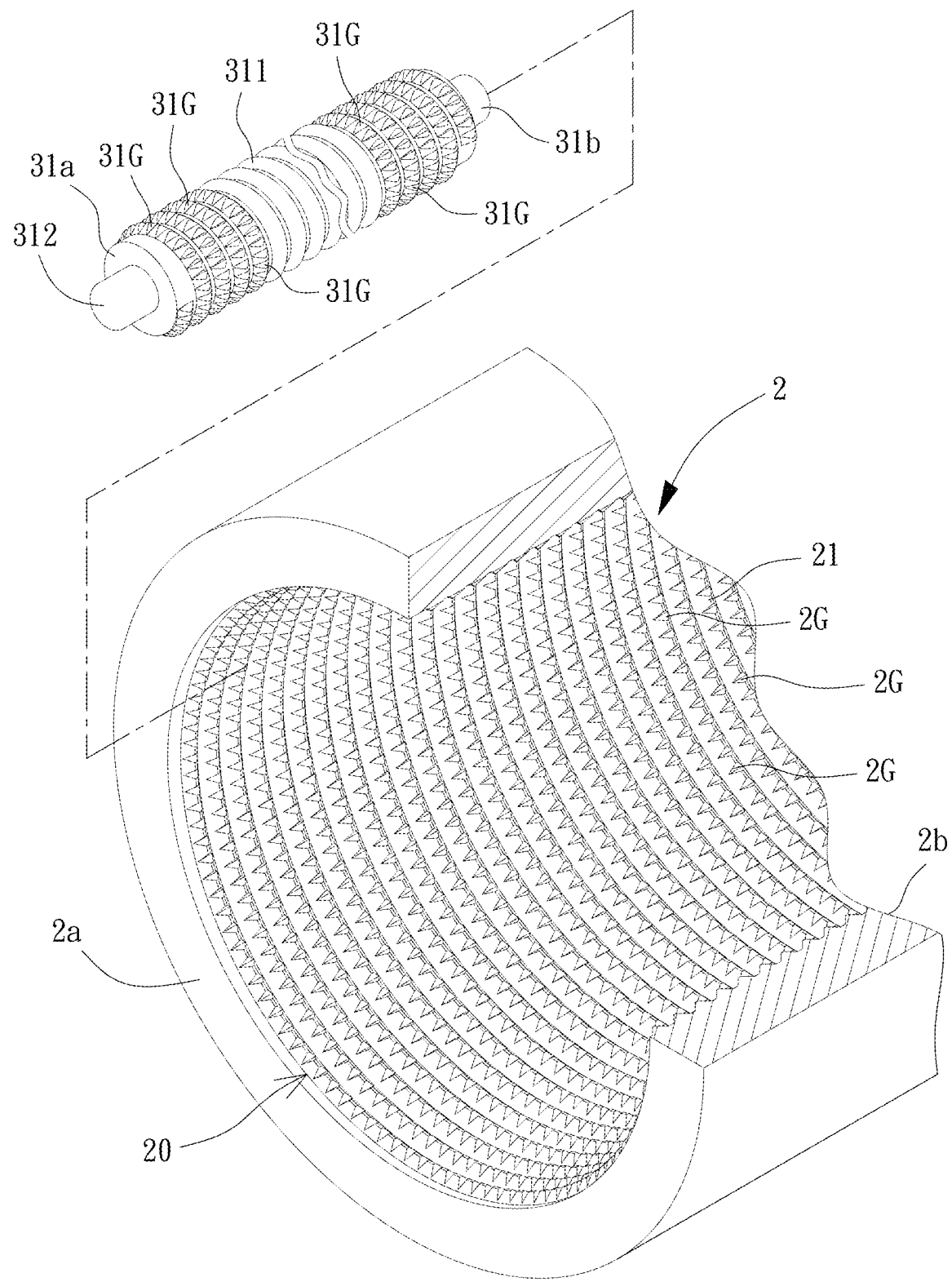
FIG. 9 is a schematic view illustrating a nut and a roller with meshable toothed portions.
Figure 10:
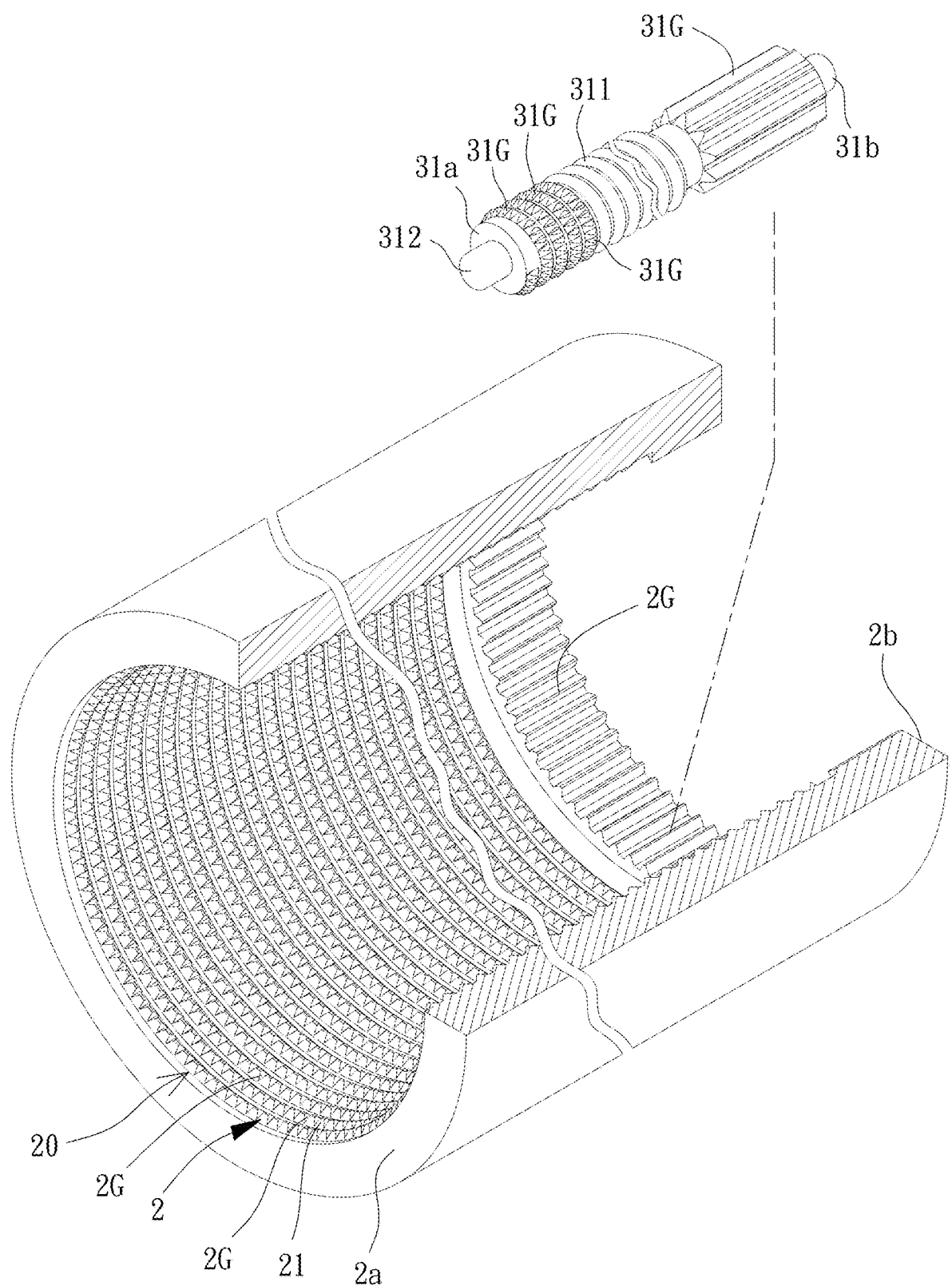
FIG. 10 is a schematic view illustrating a nut and a roller with meshable toothed portions and meshable spur gears.

Please refer to FIGS. 9 and 10 showing another preferred disposition of the nut 2 and each roller 31 of the planetary roller screw according to the present invention, which is similar to the disposition shown in FIGS. 7 and 8. The nut 2 further includes at least one toothed portion 2G. Each roller 31 further includes at least one toothed portion 31G, such that when screwed rotating occurs between the internal thread 21 of the nut 2 and the external thread 311 of each roller 31, rotating in mesh is generated between the at least one toothed portion 2G of the nut 2 and the at least one toothed portion 31G of the external thread 311 of each roller 31. Furthermore, through the rotating in mesh between the at least one toothed portion 2G of the nut 2 and the at least one toothed portion 31G of each roller 31, when the planetary assembly 3 rotates (each roller 31 revolves about the main screw 1), each roller 31 revolves through pure rolling/rotation without unexpected friction caused by sliding motion, thereby increasing the smoothness while the whole planetary roller screw is running.

In the example shown in FIG. 9, the nut 2 includes a toothed portion 2G disposed throughout the external thread 21. Nevertheless, in other examples (not illustrated), the toothed portion 2G may be arranged to be in the form of a single section or plural sections disposed in a single local area or plural local areas of the nut 2 or the internal thread 21 of the nut 2. Each roller 31 includes two toothed portions 31G respectively disposed on two local areas respectively adjacent to the two ends (namely, the top end 31a and the bottom end 31b) of the external thread 311 of the roller 31. In other examples (not illustrated), the toothed portion 31G may be arranged to be in the form of a single section disposed throughout the external thread 311 or in the form of a single section or plural section disposed in a single local area or plural local areas of the roller 31 or the external thread 311 of the roller 31.

The example shown in FIG. 10 is different from the example shown in FIG. 9 by that the nut 2 further includes another toothed portion 2G disposed on an outer portion of one of the two ends in the axial direction of the internal thread 21 of the nut 2. Furthermore, the another toothed portion 2G has a spur gear structure. One of the two toothed portions 31G of each roller 31 is disposed on an outer portion of one of the two ends of the external thread 311 of the roller 31 in the axial direction. Furthermore, the one of the two toothed portions 31G has a spur gear structure to mesh with the toothed portion 2G with the spur gear structure. It should be noted that the toothed portion 2G with the spur gear structure and the toothed portion 31G with the spur gear structure shown in FIG. 10 are disposed on the outer portion of the bottom end 2b of the nut 2 and the outer portion of the bottom end 31b of the respective roller 31, respectively. Nevertheless, in other dispositions, the toothed portion 2G with the spur gear structure and the toothed portion 31G with the spur gear structure may be disposed on the outer portion of the top end 2a of the nut 2 and the outer portion of the top end 31a of the respective roller 31. In another example (not illustrated), the nut 2 may include two toothed portions 2G (with spur gear structures) respectively disposed on the outer portion of one of the two ends of the internal thread 21 and the outer portion of another of the two ends of the internal thread 21, such that the internal thread 21 is located between the two toothed portions 2G. Each roller 31 may also include two toothed portions 31G (with spur gear structures) respectively disposed on the outer portion of one of the two ends of the external thread 311 of the roller 31 and the outer portion of another of the two ends of the external thread 311 of the roller 31, such that the external thread 311 of the roller 31 is located between the two toothed portions 31G.

It should be noted that, according to the examples shown in FIGS. 7-10, to make each roller 31 undergoes a motion pattern of pure rolling relative to the main screw 1 and the nut 2, the "toothed portion" according to the present invention may be disposed on the main screw 1 and each roller 31, or disposed on the nut 2 and each roller 31, or disposed on the main screw 1, the nut 2, and each roller 31. The term "toothed portion" refers to the toothed portion 1G of the main screw 1, the toothed portion 2G of the nut 2, and the toothed portion 31G of each roller 31. Particularly, the location and area/range of the toothed portion disposed on the main screw 1, the nut 2, and each roller 31 may be arranged according to the displacement range of the main screw 1, the nut 2, and each roller 31. Particularly, while forming the characteristics of the toothed portions, the corresponding pitch circle diameters of the main screw 1, the nut 2, and each roller 31 must be considered, and, preferably, the smallest one of the pitch circle diameters is a factor of the remaining pitch circle diameters.

It should be further noted that the toothed portions shown in FIGS. 8 and 10 use spur gear structures to achieve rotating in mesh parallel to the axial direction. Nevertheless, the present invention is not limited to spur gears and may include other structures capable of achieving rotating in mesh parallel to the axial direction.

Figure 11:
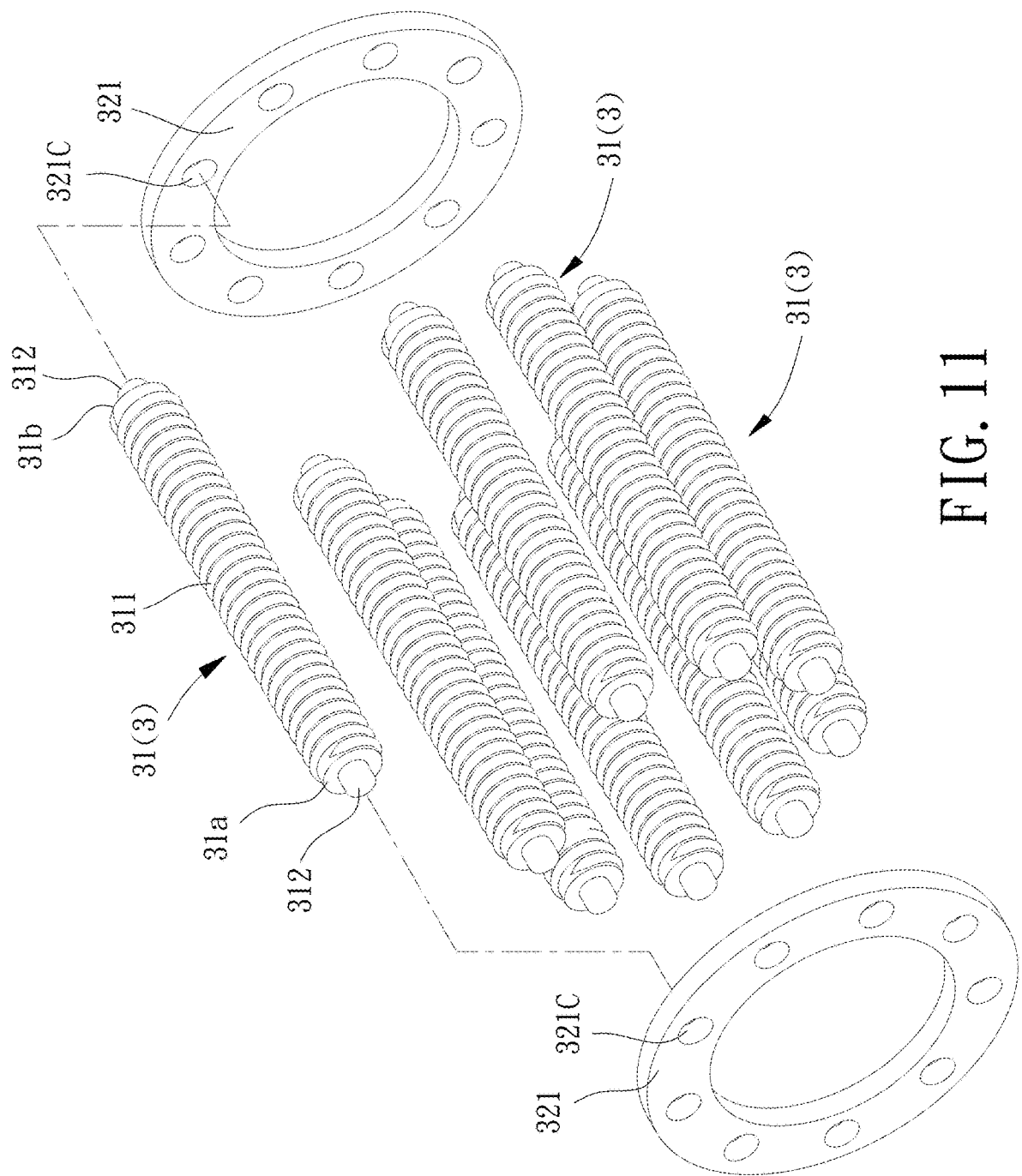
FIG. 11 is an exploded, perspective view of another preferred disposition of a planetary assembly of the planetary roller screw according to the present invention.
Figure 12:
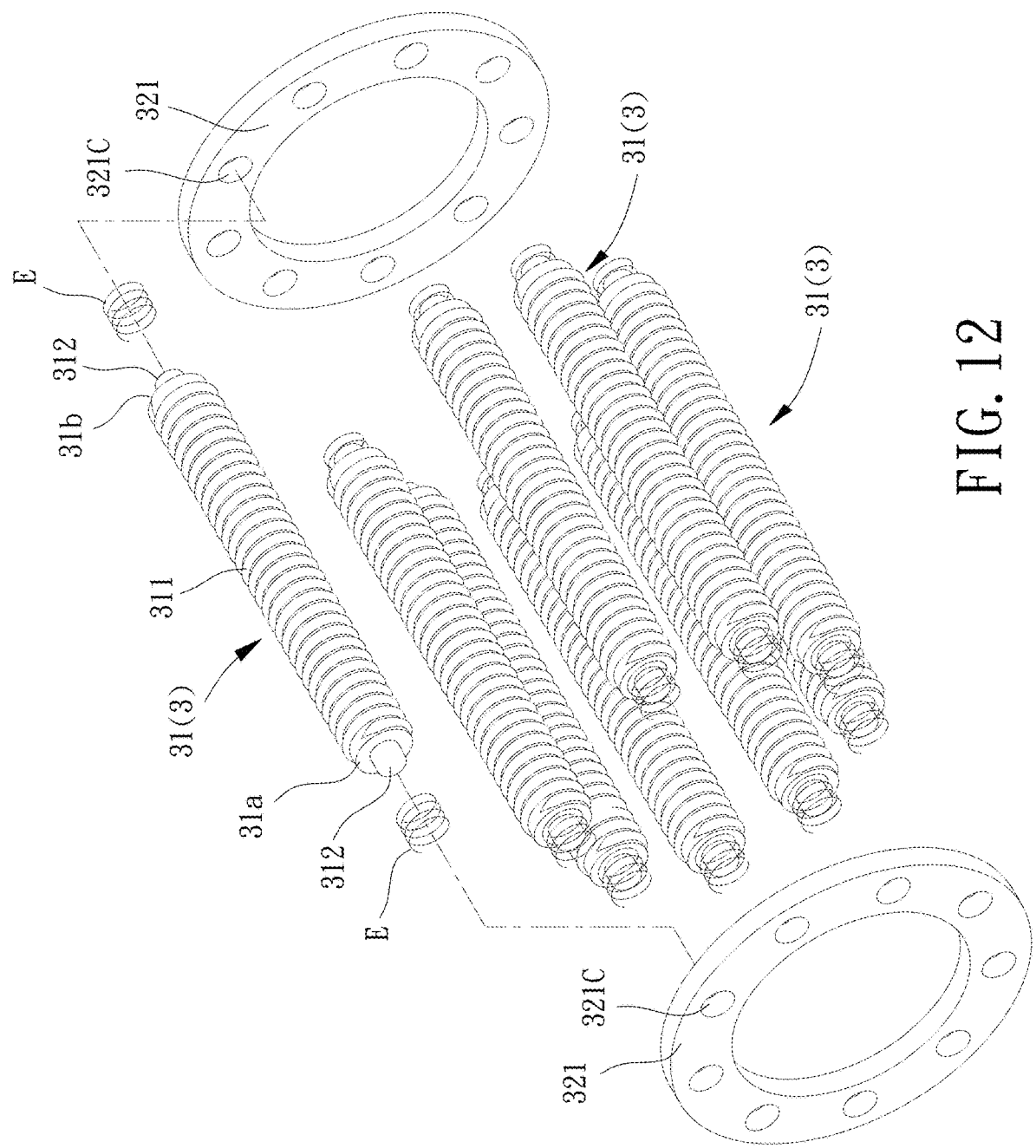
FIG. 12 is an exploded, perspective view similar to FIG. 11 with an elastic element disposed on each protruding portion of each roller.

Furthermore, referring to FIG. 11 showing a further preferred disposition of the planetary assembly 3 of the planetary roller screw according to the present invention, the annular frame portion 32 includes two rings 321 spaced from each other along the axial direction. Each of the two rings 321 includes plural recessed portions 321C spaced from each other in a circumferential direction about the axis. The plural recessed portions 321C of one of the two rings 321 are aligned with the plural recessed portions 321C of another of the two rings 321. Each protruding portion 312 of each roller 31 is partially received in a respective one of the recessed portions 321C. Particularly, each roller 31 may have a structure shown in FIGS. 2 and 7-10. It should be noted that although the recessed portions 321C shown in FIG. 12 are in the form of through-holes, the recessed portions 321C are not limited to thereto. As an example, the recessed portions 321C may be recesses rather than the through-hole structures.

Optionally, as shown in FIG. 12, each protruding portion 312 of each roller 31 is provided with an elastic element E. Each elastic element E is disposed between and abuts against a respective annular frame portion 32 and a respective roller 31. Thus, each elastic element E biases the respective roller 31 to keep a certain tension in the axial direction to avoid the respective roller 31 from deviating away from the axial direction during motion. Preferably, each elastic element E may be in the form of a coil spring.

Based on the disposition and motion mechanism of the planetary roller screw according to the present invention, one of the main screw 1, the nut 2, and each roller 31 may be used as a driving member, and the other two of the main screw 1, the nut 2, and each roller 31 are followers. When the driving member rotates, the linear displacement direction of the planetary assembly 3 relative to the nut 2 is opposite to the linear displacement direction of the main screw 1 relative to the planetary assembly 3. Furthermore, the demands in the motion relationship and precision of the main screw 1, the nut 2, and each roller 31 may be fulfilled by adjustments of the conditions of the pitch circle diameters, the numbers of thread starts, and the pitches of the main screw 1, the nut 2, and each roller 31.

Thus, in the planetary roller screw according to the present invention, by the provision that the helix direction of the internal thread of the nut is the same as the helix direction of the external thread of each roller and opposite to the helix direction of the external thread of the main screw, decelerated displacement may occur between the main screw and the nut to thereby achieve more precise displacement control. Particularly, by the motion relationship between the driving member and the followers of the planetary roller screw according to the present invention, the planetary roller screw according to the present invention may replace hydraulic cylinders and may be used in various tool machines, brake devices, humanoid robots, etc. requiring precise control of linear motion.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims. Furthermore, in a case that several of the above embodiments can be combined, the present invention includes the implementation of any combination.

What is claimed is:

1. A planetary roller screw comprising:
   a main screw including an outer periphery having an external thread extending along an axis of the main screw, wherein the axis of the main screw defines an axial direction;
   a nut including a through-hole extending along the axial direction, wherein the nut includes an inner periphery surrounding the through-hole, wherein the inner periphery has an internal thread extending along the axial direction, wherein all or a portion of the external thread of the main screw is located in the through-hole of the nut; and
   a planetary assembly including plural rollers each extending along another axis parallel to the axis of the main screw, each roller includes an outer periphery having an external thread, wherein at least a portion of each roller is located in the through-hole of the nut, and wherein the external thread of each roller meshes with the external thread of the main screw and the internal thread of the nut,
   wherein a pitch of the external thread of the main screw, a pitch of the internal thread of the nut, and a pitch of the external thread of each roller are identical, wherein a helix direction of the external thread of the main screw is opposite to a helix direction of the internal thread of the nut,
   wherein one of the main screw, the nut, and the planetary assembly is a driving member, wherein when the driving member rotates, a linear displacement direction of the planetary assembly relative to the nut is opposite to a linear displacement direction of the main screw relative to the planetary assembly.

2. The planetary roller screw as claimed in claim 1, wherein the internal thread of the nut has plural thread starts, and wherein the external thread of the main screw has plural thread starts.

3. The planetary roller screw as claimed in claim 2, wherein a number of the thread starts of the internal thread of the nut is different from a number of the thread starts of the external thread of the main screw.

4. The planetary roller screw as claimed in claim 1, wherein the helix direction of the internal thread of the nut is opposite to a helix direction of the external thread of each roller.

5. The planetary roller screw as claimed in claim 1, wherein the planetary assembly further includes an annular frame portion disposed between the main screw and the nut, wherein the annular frame portion includes plural receiving portions, wherein a number of the plural receiving portions is not smaller than a number of the plural rollers, and wherein each roller is received in a corresponding one of the plural receiving portions.

6. The planetary roller screw as claimed in claim 5, wherein the annular frame portion is an annular member, wherein the plural receiving portions form plural through-holes each extending in a radial direction of the annular frame portion, and wherein when each roller is received in the corresponding one of the plural receiving portions, each roller and the corresponding receiving portion have a gap therebetween in a circumferential direction of the annular frame portion about an axis of the annular frame portion.

7. The planetary roller screw as claimed in claim 1, wherein each of two ends of each roller in the axial direction includes a protruding portion, wherein the planetary assembly further includes an annular frame portion disposed between the main screw and the nut, wherein the annular frame portion includes two rings spaced from each other along the axial direction, wherein each of the two rings includes plural recessed portions spaced from each other in a circumferential direction about an axis of the annular frame portion, wherein the plural recessed portions of one of the two rings are aligned with the plural recessed portions of another of the two rings, and wherein each protruding portion of each roller is partially received in a respective one of the recessed portions.

8. The planetary roller screw as claimed in claim 7, wherein each protruding portion of each roller is provided with an elastic element, and wherein each elastic element is disposed between and abuts against a respective one of the annular frame portions and a respective roller.

9. The planetary roller screw as claimed in claim 1, wherein each of the external thread of the main screw, the internal thread of the nut, and the external thread of each roller includes an arcuate flank.

10. The planetary roller screw as claimed in claim 1, wherein the external thread of the main screw further includes at least one toothed portion, wherein the external thread of each roller of the planetary assembly includes at least one toothed portion, and wherein when screwed rotating occurs between the external thread of the main screw and the external thread of each roller, rotating in mesh is generated between the at least one toothed portion of the main screw and the at least one toothed portion of the external thread of each roller.

11. The planetary roller screw as claimed in claim 1, wherein the internal thread of the nut includes at least one toothed portion, wherein the external thread of each roller of the planetary assembly includes at least one toothed portion, and wherein when screwed rotating occurs between the internal thread of the nut and the external thread of each roller, rotating in mesh is generated between the at least one toothed portion of the nut and the at least one toothed portion of the external thread of each roller.

* * * * *